(19) United States Patent
Beitz

[11] 4,233,945
[45] Nov. 18, 1980

[54] CARBURETION IN AN INTERNAL COMBUSTION ENGINE

[76] Inventor: Elden W. Beitz, 262 Main St., Oakfield, Wis. 53065

[21] Appl. No.: 944,652

[22] Filed: Sep. 21, 1978

[51] Int. Cl.³ .............................................. F02M 31/00
[52] U.S. Cl. ...................................... 123/585; 123/557
[58] Field of Search .............. 123/122 E, 133, 119 D, 123/124 R, 141; 261/79 R, 63 A, DIG. 39, 144, 145; 48/180 R, 180 A

[56] References Cited

U.S. PATENT DOCUMENTS

| 1,038,262 | 9/1912 | Anstice | 261/79 R |
| 1,150,115 | 8/1915 | Heinze | 48/180 A |
| 1,153,999 | 9/1915 | Carpenter | 261/79 R |
| 1,300,600 | 4/1919 | Giesler | 123/122 E |
| 2,205,750 | 6/1940 | Ross | 123/122 E |
| 3,077,391 | 2/1963 | Guffa | 123/141 |
| 3,986,486 | 10/1976 | Rabbiosi | 123/122 E |
| 3,990,421 | 11/1976 | Grainger | 123/119 D |
| 4,014,303 | 3/1977 | Aiti | 123/119 D |
| 4,146,002 | 3/1979 | Quinn | 123/122 E |

Primary Examiner—Ronald H. Lazarus
Attorney, Agent, or Firm—Michael, Best & Friedrich

[57] ABSTRACT

Apparatus is provided for use in an internal combustion engine for increasing the efficiency of the engine and more particularly for improving the carburation of fuel supplied to the engine. The apparatus includes the combination of a heat exchanger in the fuel line for heating liquid fuels supplied to the engine carburetor, a plurality of deflecting blades positioned adjacent to the carburetor air intake for causing turbulation of air entering the carburetor, and an air injector for forcing air into the carburetor throat downstream of the carburetor Venturi section and to increase the proportion of air in the fuel mixture.

11 Claims, 2 Drawing Figures

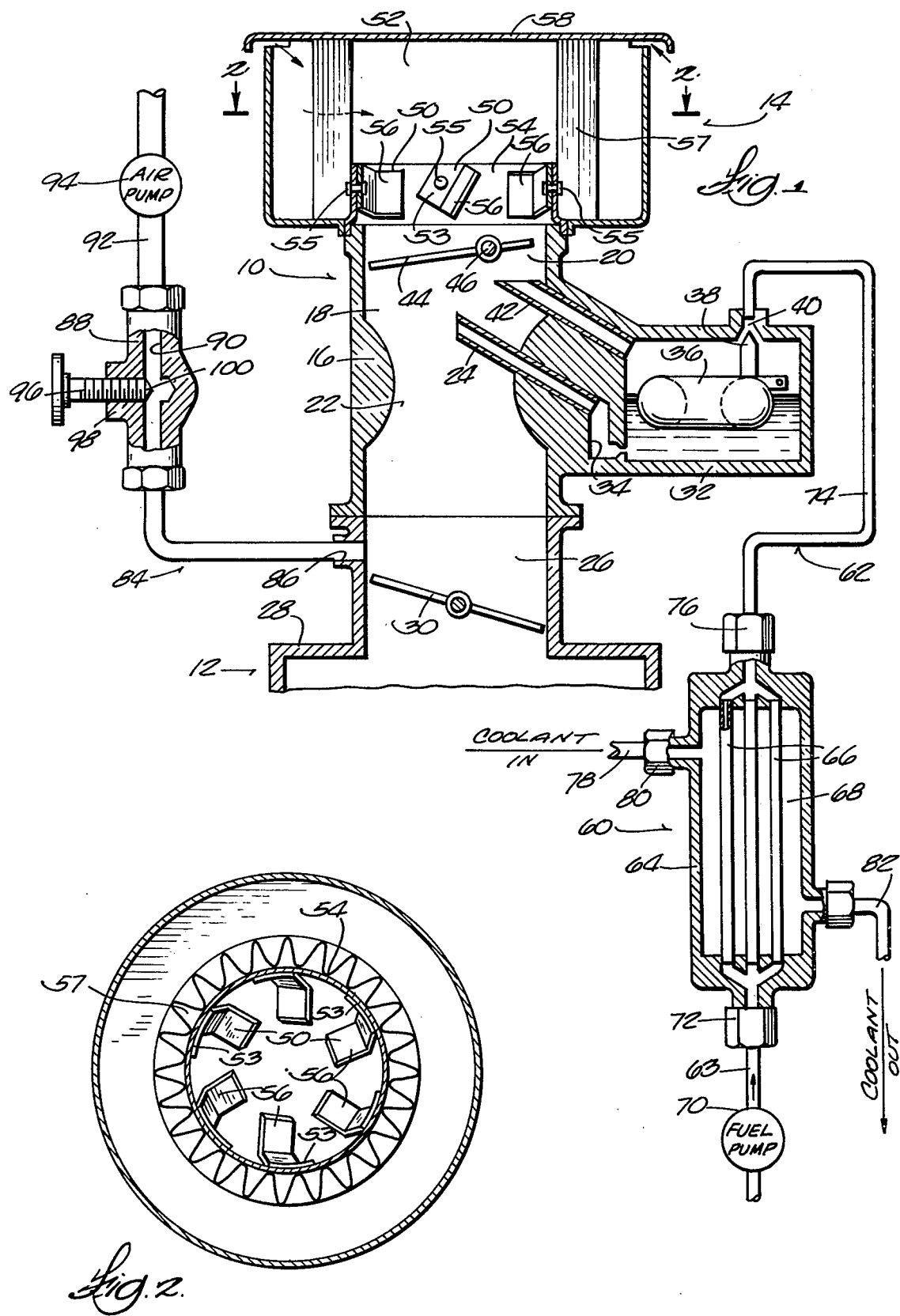

CARBURETION IN AN INTERNAL COMBUSTION ENGINE

BACKGROUND OF INVENTION

The invention relates to internal combustion engines and more particularly to means for improving the efficiency and fuel economy of an internal combustion engine by improving the carburation of fuel fed to the engine by utilizing the combination of means for turbulating air supplied to the carburetor, means for heating the liquid fuel supplied to the carburetor, and means for injecting air into the carburetor adjacent the throttle plate.

In order to obtain better fuel economy and efficiency in internal combustion engines used in automobiles many attempts have been made to improve the carburation of fuel flowing into the engine. For example, the U.S. Amano Pat. No. 4,027,639, issued June 7, 1977, discloses a mechanism for preheating fuel conveyed to the carburetor to provide for better ignition and higher efficiency of combustion in the engine.

Attention is also directed to the U.S. Zeratsky et. al Pat. No. 1,644,766, issued Oct. 11, 1927, which illustrates a means for increasing the velocity of air entering the carburetor and for giving it a whirling motion to thereby increase the facility with which the entering air will mix with the gasoline injected into the air by the carburetor. Similarly, the U.S. Baytan Pat. No. 3,743,255, issued July 3, 1973, shows another mechanism provided to increase the efficiency of an internal combustion engine and for attachment to a conventional carburetor and intended to function to cause a swirling of air flowing into the carburetor to improve mixing of the fuel and air in the carburetor.

Attention is further directed to the U.S. Marsh Pat. No. 1,619,082, issued Mar. 1, 1927 and illustrating means for forcing additional air into the intake manifold of an engine to increase the air in the air to fuel ratio in an attempt to maximize the quantity of air mixed with the fuel entering the engine.

Attention should also be directed to U.S. Pat. No. 2,029,853, issued Feb. 4, 1936 to Campanella and showing a carburetor having a fan disposed in the air intake passage and upstream of the carburetor to provide for mixing of air and fuel in the carburetor.

SUMMARY OF THE INVENTION

The invention includes an internal combustion engine including an intake manifold and a carburetor having a carburetor body with a fluid flow passage therethrough, the passage including one end providing an air inlet and another end connected to the intake manifold. The engine further includes a throttle valve positioned in that end of the fluid flow passage connected to the intake manifold, and means for supplying fuel to the carburetor. The engine also includes means for heating fuel supplied to the carburetor, means for turbulating air flowing through the inlet, and means for injecting air into the carburetor fluid flow passage One of the principal features of the invention is the provision of the means for heating fuel supplied to the carburetor including a container surrounding at least a portion of the fuel line, the container including a cavity surrounding the fuel line, and means for conveying heated engine cooling system fluid through the cavity to heat fuel flowing through the fuel line.

Another of the features of the invention is the provision in the internal combustion engine of means for turbulating air flowing through the inlet which includes a plurality of deflector blades located in spaced relation around the periphery of the air inlet, the deflector blades each disposed at an acute angle with respect to the periphery of the air inlet and extending inwardly from the periphery.

Another of the features of the invention is the provision in the internal combustion engine of means for injecting air into the carburetor flow passage which includes an air conduit through the carburetor body and having one end communicating with the fluid flow passage adjacent to the throttle valve and means for forcing air through the air conduit including an air pump drivingly connected to the engine and driven at a speed proportional to the speed of the engine.

Other features of the invention will become known by reference to the following description, to the appended claims, and to the drawings.

BRIEF DESCRIPTION OF THE DRAWINGS

FIG. 1 is a diagrammatic view of a carburetor mounted on an internal combustion engine and embodying the invention; and FIG. 2 is a cross-section view taken along line 2—2 in FIG. 1

Before explaining at least one embodiment of the invention in detail, it is to be understood that the invention is not limited in its application to the details of construction and the arrangement of the components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

DESCRIPTION OF THE PREFERRED EMBODIMENT

Illustrated in FIG. 1 is a carburetor 10 positioned on an internal combustion engine 12, and an air cleaner 14 is supported on the carburetor 10. The carburetor 10 generally includes a body 16 having a central fluid flow passage or throat 18 including an inlet end 20 communicating with the air cleaner 14 and facilitating air flow from the air cleaner into the carburetor. The fluid flow passage 18 also includes a Venturi portion 22 at which a fuel nozzle 24 opens to provide for mixing of fuel and air flowing through the fluid flow passage 18. The fuel mixture will flow through the outlet end 26 of the liquid flow passage 18 and into the intake manifold 28 of the engine 12. Fluid flow into the intake manifold 28 is controlled by a movable accelerator or throttle plate 30. The throttle plate 30 comprises a generally circular disk centrally disposed in the outlet end 26 of the fluid flow passage 18 and pivotably supported for movement between an open position and a flow restricting position.

The carburetor 10 further includes a float chamber or reservoir 32 for containing liquid fuel and for supplying fuel to the fuel nozzle 24 through a passage 34. A float 36 is disposed in the float chamber 32 and supports a needle valve 38 to control the flow of the fuel into the float chamber 32 through a fuel inlet 40 so that a predetermined level of fuel is constantly maintained in the float chamber 32. An air vent 42 is also provided which discharges fuel vapor generated in the float chamber 32 toward the inlet end 20 of the fuel flow passage. A choke plate 44 is provided in the inlet end 20 of the fuel flow passage 18 upstream of the Venturi portion, the choke plate 44 being pivotable around a stem 46 to control the amount of air flowing into the carburetor.

Means are additionally provided to cause turbulation of the air flowing through the air cleaner 14 into the inlet end 20 of the carburetor 10, such turbulation of the air being provided to improve the mixture of the fuel and the air entering the engine 12. More particularly, the turbulation means is intended to impart a rotary motion to the air flowing through the air cleaner 14 into the carburetor 10 to thereby increase the velocity of the air entering the carburetor and increasing the facility with which the air will mix with the fuel to produce the desired fuel mixture. While various arrangements can be provided, in the illustrated construction the turbulation means includes a cylindrical ring 54 (FIG. 2) supported within the central cylindrical chamber 52 of the air cleaner 14 and positioned adjacent to the inlet end 20 of the carburetor throat 18 in coaxial relation with the carburetor throat. The upper edge of the cylindrical ring 54 is spaced below the cover plate 58 of the air cleaner. A plurality of vanes or deflecting blades 50 are attached to the inner wall of the cylindrical ring 54 in circumfrentially spaced relation and extend generally radially inwardly. The vanes 50 each include one portion 53 secured against the wall of the cylindrical ring 54 by rivets 55 or the like, and an inwardly extending portion 56 disposed an angle of approximately 60° with respect to the longitudinal axis of the carburetor throat 18, i.e. with respect to the direction of fluid flow through the carburetor throat. The inwardly extending portion 56 of the vanes 50 are thin and generally planar and are disposed at an angle of approximately 90° to the portion 53.

In operation, the vacuum generated in the intake manifold 28 during operation of the engine 12 causes air to be pulled through the filter material 57 of the air cleaner 14 into the cylindrical cavity 52 of the air cleaner 14 and downwardly through the cylindrical ring 54 and past the vanes 50 into the carburetor throat 18. As the air moves through the cylindrical ring 54 into the carburetor throat 18, the deflecting blades 50 cause the air to swirl. The swirling effect or turbulation of the air entering the carburetor throat 18 functions to increase the velocity of the air in the carburetor throat and to thereby improve the mixing of the fuel and air in the carburetor.

Means are also provided for heating the fuel supplied to the carburetor such that the liquid fuel is raised to a temperature near, but below, its boiling point. By raising the temperature of the liquid fuel, vaporization of the fuel in the Venturi section 22 of the carburetor throat 18 is facilitated, thereby improved the mixing of the fuel and air in the carburetor 10 and improving the fuel efficiency of the engine 12. While various arrangements can be provided, in the illustrated construction the means for heating the liquid fuel supplied to the carburetor 10 includes a heat exchanger 60 positioned in the fuel line 62 and connected to the engine cooling system. The heat exchanger 60 is comprised of a hollow cylindrical tube 64 closed at both ends and having three thin parallel spaced fuel lines 66 extending longitudinally through the chamber 68 defined in the tube 64. More particularly, the fuel portion 63 extending from the engine fuel pump 70 is threadably connected to one end of the cylindrical heat exchanger 60 by a threaded tubing coupling 72. A second fuel line portion 74 extends from the opposite end of the cylindrical heat exchanger 60 to the float chamber 36 of carburetor 10. The fuel line 74 is similarly connected to the cylindrical heat exchanger 60 by a threaded tubing coupling 76.

Means are also provided for conducting the heated engine coolant fluid from the engine block to the chamber 68 of the heat exchanger 60 to provide for heating of the fuel as the fuel passes through the heat exchanger 60. While various arrangements can be provided, in the illustrated construction the means for conveying the coolant to the heat exchanger includes a conduit 78 connected at one end to the engine cooling system and connected at its other end by a threaded coupling 80 to the cylindrical heat exchanger 64 to provide for fluid communication with the chamber 68 in the heat exchanger 64. A cooling fluid return conduit 82 extends from an opposite side of the cylindrical exchanger 64 and is connected at its opposite end to the engine cooling system. In one construction the conduit 78 can be connected to one of the heater hose couplings, and the return conduit 82 can be connected to the upstream side of the engine water pump.

During operation of the engine, the heated fluid in the engine cooling system is forced through the conduit 78 into the chamber 68 of the cylindrical heat exchanger 64 thereby heating the liquid fuel as it passes through the heat exchanger 60. By providing a plurality thin fuel conduits 66 through the chamber in the heat exchanger, the efficiency of operation of the heat exchanger is increased.

Means are additionally provided for forcing additional air into the carburetor throat 18 downstream of the Venturi portion 22 and to function to increase the ratio of air to fuel in the fuel mixture, thereby facilitating more complete combustion of the fuel and more efficient operation of the engine 12. While various arrangements can be provided, in the illustrated construction such means includes a conduit 84 for providing air flow through a bore 86 extending through the wall of the carburetor body 16 and into the carburetor throat 18 adjacent the lower or outlet end 26 of the throat, and more particularly, immediately above the throttle plate or accelerator plate 30.

The conduit 84 includes therein a cylindrical valve body 88 having a central bore or air passage 90. An air hose 92 is connected at one end to the valve body 88 and is connected at an opposite end to an air pump 94. The air pump 94 can be driven by the fan belt (not shown) of the internal combustion engine 12. Air pumps 94, which are driven by the engine fan belt, are conventional in other applications and have been used, for example, in the pollution control system in 1973 Chevrolet automobiles having 307 cubic inch, 8 cylinder engines.

The air injection means also includes a valve mechanism for controlling air flow through the cylindrical valve body 88 and into the carburetor throat 18. While various arrangements can be provided, in the illustrated construction the valve mechanism includes a needle valve 96 threadably supported in a threaded bore 98 in the valve body 88 and having an end 100 extending into the central bore 90 in the cylindrical valve body and restricting air flow through the central bore 90.

During operation of the engine 12, the air pump 94 causes air to be forced through the conduit 84 into the carburetor throat 18. Air flowing into the carburetor throat 18 will mix with the fuel-air mixture flowing into the carburetor 10, thereby increasing the air to fuel ratio and providing for increased efficiency and fuel economy. The quantity of air flowing through the air injector can be controlled by the position of the needle valve 96 in the central bore 90. The air flow is also controlled during operation by the air pump 94 and by the throttle plate 30. Since the air pump 94 is driven directly by an engine fan belt, the output of the air pump is proportional to the speed of operation of the engine. The air flowing through the conduit is also controlled by the relative position of the throttle plate 30 in the outlet end 26 of the carburetor throat since the air conduit 84 is connected to the carburetor throat 18 upstream of the throttle plate 30. For example, when the engine 12 is running at a low RPM or idling, the throttle plate 30 is positioned as shown in FIG. 1 and it thereby restricts fuel mixture flow through the carburetor throat 18 and also restricts air flow from the air injection means into the carburetor throat. Accordingly, only limited amounts of air are injected into the air-fuel mixture and the resultant fuel mixture is maintained relatively rich. As the throttle plate 30 is rotated in the clockwise direction, through the carburetor, increased air flow through the air injection means is also permitted such that the ratio of air injected into the fuel mixture by the air injection means remains relatively constant.

The combination of the above identified means for heating the liquid fuel supplied to the carburetor, the means for turbulating the air entering the carburetor, and the means for injecting additional air into the fuel mixture functions to substantially increase the fuel economy of an automobile engine so equipped. The following is an example of the results produced in accordance with the invention:

EXAMPLE

A 1973 Chevrolet Chevelle having a standard transmission and an 8 cylinder, 307 cubic inch displacement engine with a 2-barrel carburetor was equipped with the combination of fuel economizing mechanisms defined above. During initial tests and prior to installation of the apparatus of the combination of the invention, the automobile was driven approximately 85 miles, most of the driving being on the highway. The gasoline mileage achieved was approximately 13 to 14 miles per gallon. During similar subsequent tests over the same course and using the same automobile, the addition of a commercially available electronic ignition system produced gas mileage 17 miles per gallon. When the combination of elements defined above were then added, and when the automobile was operated in substantially the same manner as in the initial tests, the resulting gasoline mileage dramatically increased to approximately 21 to 26.5 miles per gallon.

During additional experimentation with the same automobile, the engine was equipped with a single one of the devices of the combination of the invention and with pairs of the devices. Results indicated that the addition of any one of the devices defined above only increased the obtainable mileage by one to two miles per gallon. Similarly, use of any two of the devices yielded an improvement of only two to three miles per gallon. However, as specified above, the use of the combination of the means for turbulating the air entering the carburetor, the air injection means, and the means for preheating the fuel, unexpectedly yielded gas mileage as high as 26.5 miles per gallon.

Various of the features of the invention are set forth in the following claims.

What is claimed is:

1. In an internal combustion engine including an intake manifold, a carburetor having a carburetor body with a fluid flow passage therethrough, said passage including one end providing an air inlet and another end connected to said intake manifold, a choke plate positioned in said one end of said passage, means for providing for pivotal movement of said choke plate, means for controlling fluid flow through said passage including a throttle valve positioned in said another end, means for supplying fuel to the carburetor, and an air cleaner positioned on said carburetor body and including a central cylindrical cavity communicating with said air inlet, the improvement comprising in combination,
   means for heating fuel supplied to said carburetor,
   means for turbulating air flowing through said air inlet, said means for turbulating air flowing through said air inlet including a plurality of blades located in said central cylindrical cavity and adjacent said inlet opening upstream of said choke plate and spaced circumferentially around the periphery of said inlet opening, said blades each extending inwardly from said inlet opening periphery, and
   means for injecting air into said fluid flow passage above said throttle valve and closely adjacent said throttle valve.

2. The apparatus set forth in claim 1 wherein said means for heating fuel supplied to said carburetor includes a container, at least a portion of said fuel line extending through said container, and means for conveying engine coolant fluid through said container.

3. The apparatus as set forth in claim 2 wherein said portion of said fuel line includes at least two generally parallel fuel line conduits.

4. The apparatus set forth in claim 1 wherein said carburetor body includes a cylindrical wall surrounding said throttle valve, and wherein said means for injecting air into said fluid flow passage includes an air conduit through said cylindrical wall and having one end communicating with said fluid flow passage adjacent said throttle valve, and means for forcing air through said air conduit.

5. The apparatus as set forth in claim 4 wherein said means for forcing air through said air conduit includes an air pump and means for driving said air pump at a speed proportional to the speed of said engine.

6. The apparatus as set forth in claim 4 and further including a valve means connected to said air conduit for controlling air flow through said air conduit.

7. The apparatus set forth in claim 1 wherein said means for heating fuel supplied to said carburetor includes a container having a chamber therein and a portion of said fuel line extending through said chamber, and means for conveying engine coolant fluid through said chamber, and wherein said carburetor body includes a cylindrical wall surrounding said throttle valve, and wherein said means for injecting air into said fluid flow passage includes an air conduit through said cylindrical wall and having one end communicating with said fluid flow passage adjacent said throttle valve, and means for forcing air through said air conduit.

8. In an internal combustion engine including an intake manifold, a carburetor having a carburetor body including a cylindrical wall having a fluid flow passage therethrough, said passage including one end providing an air inlet and another end connected to said intake manifold, a throttle valve positioned in said another end, means for supplying fuel to the carburetor, and an air cleaner positioned on said carburetor body and including a central cylindrical cavity communicating with said air inlet, the improvement comprising in combination, means for heating fuel supplied to said carburetor, means for turbulating air flowing through said air inlet, said air turbulating means including a plurality of blades located in said central cylindrical cavity adjacent said inlet opening and spaced circumferentially around the periphery of said inlet opening, said blades each extending inwardly from said inlet opening periphery, and disposed at an acute angle with respect to the direction of air flowing through said fluid flow passage, and means for injecting air into said fluid flow passage above said throttle valve and closely adjacent said throttle valve, said means for injecting air into said fluid flow passage including an air conduit through said cylindrical wall and having one end communicating with said fluid flow passage adjacent said throttle valve, and means for forcing air through said air conduit including an air pump and means for driving said air pump at a speed proportional to the speed of said engine.

9. The apparatus set forth in claim 8 wherein said means for heating fuel supplied to said carburetor includes a container, at least a portion of said fuel line extending through said container, and means for conveying engine coolant fluid through said container.

10. The apparatus as set forth in claim 9 wherein said portion of said fuel line includes at least two generally parallel fuel line conduits.

11. The apparatus as set forth in claim 4 and further including a valve means connected to said air conduit for controlling air flow through said air conduit.

* * * * *